US009168659B2

(12) United States Patent
Doggett et al.

(10) Patent No.: US 9,168,659 B2
(45) Date of Patent: Oct. 27, 2015

(54) TENSION STIFFENED AND TENDON ACTUATED MANIPULATOR (71) Applicant: The United States of America, as represented by the Administrator of the National Aeronautics and Space Administration, Washington, DC (US)

(72) Inventors: William R. Doggett, Poquoson, VA (US); John T. Dorsey, Hampton, VA (US); George G. Ganoe, Yorktown, VA (US); Bruce D. King, Yorktown, VA (US); Thomas C. Jones, Newport News, VA (US); Charles D. Mercer, Chesapeake, VA (US); Cole K. Corbin, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 248 days.

(21) Appl. No.: 13/864,396

(22) Filed: Apr. 17, 2013

(65) Prior Publication Data

US 2013/0305867 A1 Nov. 21, 2013

Related U.S. Application Data (63) Continuation of application No. PCT/US2013/024321, filed on Feb. 1, 2013.

(60) Provisional application No. 61/594,115, filed on Feb. 2, 2012.

(51) Int. Cl.
*B25J 9/06* (2006.01)
*B25J 17/00* (2006.01)
(Continued)

(52) U.S. Cl.
CPC .. *B25J 18/00* (2013.01); *B25J 9/06* (2013.01); *B25J 9/1045* (2013.01); *B25J 17/00* (2013.01);
(Continued)

(58) Field of Classification Search
CPC .......... B25J 1/02; B25J 9/0009; B25J 9/1075; B25J 9/126; B25J 17/00; B25J 18/00; B25J 9/06; B25J 9/1045; B64G 2004/005; Y10T 74/20323; Y10T 4/20329; B66C 23/62; B66C 23/64; B66C 23/66; B66C 23/68
USPC ............... 74/490.04, 490.05, 490.07, 490.08, 74/89.2–89.22, 490.13; 901/19, 21; 244/159.4, 158.9, 173.1, 173.3, 244/172.4–172.6
See application file for complete search history.

(56) References Cited

U.S. PATENT DOCUMENTS 1,108,029 A  8/1914  Tull
3,045,837 A  7/1962  Liebherr et al.
(Continued)

FOREIGN PATENT DOCUMENTS

DE   7425234 U  *  9/1976  .............. B66C 23/16
DE   3223169       12/1983
(Continued)

OTHER PUBLICATIONS

PCT International Search Report and written opinion, PCT/US13/24321, Mailed Apr. 22, 2013.

*Primary Examiner* — William Kelleher
*Assistant Examiner* — Bobby Rushing, Jr.
(74) *Attorney, Agent, or Firm* — Andrea Z. Warmbier (57) ABSTRACT A tension stiffened and tendon actuated manipulator is provided performing robotic-like movements when acquiring a payload. The manipulator design can be adapted for use in-space, lunar or other planetary installations as it is readily configurable for acquiring and precisely manipulating a payload in both a zero-g environment and in an environment with a gravity field. The manipulator includes a plurality of link arms, a hinge connecting adjacent link arms together to allow the adjacent link arms to rotate relative to each other and a cable actuation and tensioning system provided between adjacent link arms. The cable actuation and tensioning system includes a spreader arm and a plurality of driven and non-driven elements attached to the link arms and the spreader arm. At least one cable is routed around the driven and non-driven elements for actuating the hinge.

15 Claims, 9 Drawing Sheets (51) Int. Cl.
  *B25J 18/00* (2006.01)
  *B66C 23/68* (2006.01)
  *B25J 9/10* (2006.01)
  *B64G 4/00* (2006.01)

(52) U.S. Cl.
  CPC ........... *B66C 23/68* (2013.01); *B64G 2004/005* (2013.01); *Y10T 74/20323* (2015.01); *Y10T 74/20329* (2015.01)

(56) References Cited

U.S. PATENT DOCUMENTS

| | | | |
|---|---|---|---|
| 3,048,371 A | 8/1962 | Klimek, Jr. | |
| 3,083,837 A | 4/1963 | Jones et al. | |
| 3,134,488 A | 5/1964 | Brekelbaum et al. | |
| 3,198,345 A | 8/1965 | Brekelbaum at al. | |
| 3,209,390 A | 10/1965 | Bassan | |
| 3,285,445 A | 11/1966 | Broziat | |
| 3,306,468 A | 2/1967 | Pollack | |
| 3,402,824 A | 9/1968 | Zweifel | |
| 3,433,368 A | 3/1969 | Durand | |
| 3,631,737 A | 1/1972 | Wells | |
| 3,685,668 A | 8/1972 | Suverkrop | |
| 4,068,827 A | 1/1978 | Fanning et al. | |
| 4,259,876 A | 4/1981 | Belyanin et al. | |
| 4,283,165 A * | 8/1981 | Vertut ............................ | 414/733 |
| 4,381,060 A * | 4/1983 | Morrow et al. ............... | 212/195 |
| 4,383,616 A | 5/1983 | Sterner et al. | |
| 4,473,214 A | 9/1984 | Sterner et al. | |
| 4,529,094 A | 7/1985 | Wadsworth | |
| 4,738,583 A | 4/1988 | Macconochie et al. | |
| 4,826,087 A | 5/1989 | Chinery | |
| 4,925,039 A | 5/1990 | Macris | |
| 4,953,720 A | 9/1990 | Okano et al. | |
| 5,253,771 A | 10/1993 | Mikulas, Jr. et al. | |
| 5,263,809 A | 11/1993 | Kent | |
| 5,445,487 A | 8/1995 | Koscinski, Jr. | |
| 5,857,648 A * | 1/1999 | Dailey et al. ................ | 244/172.6 |
| 6,280,358 B1 * | 8/2001 | Hormann .................. | F16H 7/04 254/387 |
| D467,403 S | 12/2002 | Aquino | |
| 6,499,610 B2 | 12/2002 | Spitsbergen | |
| 6,640,928 B1 | 11/2003 | Ridley, Jr. | |
| 6,655,539 B2 | 12/2003 | Bertinotti | |
| 6,669,038 B1 | 12/2003 | Zingerman | |
| 7,093,730 B2 | 8/2006 | Saint-Gerand | |
| 7,114,682 B1 | 10/2006 | Kistler et al. | |
| 7,216,774 B2 | 5/2007 | Mizuta et al. | |
| 7,617,943 B2 * | 11/2009 | Willim ......................... | 212/347 |
| 7,780,651 B2 | 8/2010 | Madhani et al. | |
| 7,878,348 B2 | 2/2011 | Doggett et al. | |
| 2002/0023891 A1 | 2/2002 | Verchere et al. | |
| 2003/0160016 A1 | 8/2003 | Ortiz et al. | |
| 2003/0217985 A1 | 11/2003 | Saint-Gerand | |
| 2004/0026350 A1 | 2/2004 | Yerly | |
| 2011/0024378 A1 * | 2/2011 | Pleuss et al. .................. | 212/276 |
| 2011/0266508 A1 * | 11/2011 | Karguth ................ | B25J 9/1045 254/392 |

FOREIGN PATENT DOCUMENTS

| | | |
|---|---|---|
| DE | 4403687 | 8/1995 |
| SU | 504124 | 2/1976 |
| WO | WO 2007 008187 A2 | 1/2007 |

* cited by examiner

TENSION STIFFENED AND TENDON ACTUATED MANIPULATOR

CROSS-REFERENCE TO RELATED APPLICATION

This patent application is a continuation of Patent Cooperation Treaty patent application number PCT/US13/24321, filed Feb. 1, 2013, which claims the benefit of and priority to U.S. Provisional Application Ser. No. 61/594,115, filed Feb. 2, 2012. The contents of each of the foregoing are hereby incorporated by reference in their entireties.

STATEMENT REGARDING FEDERALLY SPONSORED RESEARCH AND DEVELOPMENT

The invention described herein was made in the performance of work under NASA contracts and by employees of the United States Government and is subject to the provisions of 51 U.S.C. §20135 and 35 U.S.C. §202, and may be manufactured and used by or for the Government of the United States of America for governmental purposes without the payment of any royalties thereon or therefor. In accordance with 35 U.S.C. §202, the contractor elected not to retain title.

FIELD OF THE INVENTION

The present invention relates to tension stiffened and tendon actuated manipulators.

BACKGROUND OF THE INVENTION

Space-based manipulators are known in the art. Advanced long-reach high-performance manipulators are needed to support in-space operations such as Near Earth Object berthing, telescope assembly and satellite servicing. Manipulators that can lift, translate and precisely position payloads, equipment and infrastructure on planetary surfaces are necessary to execute most space exploration missions. The requirements for these planetary surface devices include having long reach (to unload landers for example), package efficiently for launch, be able to exert large tip forces and have low mass.

It has been concluded that conventional (Earth-based) robotic manipulator configurations would have extreme difficulty meeting planetary surface requirements because their mass increases rapidly with increases in reach and payload handling mass. In Earth-bound applications, cranes are mass efficient devices that have long reach and high payload capability, but cranes lack the dexterity and versatility found in robotic manipulators.

In order to meet planetary surface requirements, a hybrid crane/manipulator, the Lightweight Surface Manipulation System (LSMS), was created. The LSMS is a cable-actuated manipulator that achieves high structural efficiency by using an architecture that reacts payload handling load through members acting in either pure tension or compression (as opposed to bending in conventional robotic manipulators). Further mass efficiency, achieved by using the tension structure (cables) to also articulate the LSMS arm hinges, is enabled by the mechanical advantage inherent in the tension/compression LSMS architecture. Lightweight hoists are used to reel cable in and out (thus articulating the hinge), replacing the massive high-torque motor gear-boxes used in a conventional boom manipulator.

In-space applications, just as in a ground-based application, for a desired applied tip force, the structural efficiency of a traditional boom/rotary-hinge manipulator architecture rapidly degrades as the manipulator reach is increased. The ISMS uses the tension/compression member architecture with tendon-controlled articulation architecture to achieve high structural efficiency. Similarly, a manipulator that is based on an architecture of tension-stayed booms and tendon-controlled articulating hinges has the potential to achieve the high structural efficiency necessary to make long-reach manipulators practical. The LSMS takes advantage of gravity and LSMS self-weight, plus the weight of the payload, to maintain tension forces in the cables during articulation. Cable stiffened structures have also been developed for many space applications and structures, but have never been considered as components in a space robotic manipulator.

There are many critical features that must be present in a manipulator if it is to be viable for space missions. The manipulator must be lightweight, stiff, package efficiently, reliably deploy and operate reliably. It is also desirable for the manipulator to have the ability to restow. For the case of a hyper dexterous manipulator (HDM), it must also have a large range of motion, allowing it to avoid obstacles away from the wrist/tip while reaching into difficult to access locations. A high level of dexterity can be achieved by using the traditional approach of using a large number of link-actuator pairs (with manipulator complexity increasing as the number of link/hinge pairs increases).

A major capability for a manipulator, defined as its stiffness, is the ability to apply a force at its tip/wrist without exceeding a specified level of deflection. High stiffness can be desirable to provide the tools/end effectors a stable platform off of which to work, to provide a high degree of stability and precision and/or prevent large deflections that might cause the arm to collide with surrounding objects. For a given tip force, as stiffness is increased, the deflection decreases. For a selected material construction, the stiffness of a tubular link, as found in most conventional manipulators, is increased by increasing the tube diameters. At some point, increasing tube diameter becomes impractical because of either packaging limitations, or the size of the tube impedes operations, or the ability to reach into tight spaces.

The articulating hinges in a manipulator are designed to apply a moment such that a force of a specified magnitude is generated at the manipulator tip/wrist. In a conventional manipulator, the hinges are typically actuated by motor-driven gearboxes that incorporate brakes on the motors and which generate a moment about their drive axis. Compared to the structural links, these conventional manipulator hinge designs provide the dominant contribution to the manipulator mass as well as its compliance.

A more recent focus on in-space missions has identified a need for long-reach, low-mass manipulators that can support operations for missions to Near Earth Objects, orbital debris removal, satellite and propellant depot servicing, rapid International Space Station resupply, and large telescope assembly. As with ground-based applications, the current state of the art for manipulators, the Shuttle and Space Station Remote Manipulator Systems (SRMS and SSRMS), represent conventional embodiments consisting of long lightweight tubular booms, connected by massive rotary torque hinge, gearbox and motor system. The SRMS and SSRMS have proven the benefit of long reach manipulators in the 15-18 meter class. The SRMS has a maximum reach of approximately 50 feet and can exert a maximum tip force of 12 pounds and has a design goal of 10 lbf/inch stiffness measured as deflection at the tip for the fully extended (straight) arm. The total weight (on Earth) of the SRMS is 905 lbf, with the hinges (shoulder, elbow and wrist) weighing 561 lbf and the links (upper and lower arm) having a combined weight of 108 lbf. The hinges dominate, at 84%, the combined mass of the hinges and links in the manipulator. In addition, the compliance of the hinges in rotation dominates the stiffness of the manipulator as measured at the tip. As the required reach for a manipulator increases, a conventional configuration suffers from the same rapid increase in mass as a ground-based manipulator.

While the SRMS and SSRMS have proven the benefit of long reach manipulators with the reach of both manipulators in the 15-18 meter class, manipulators with an even greater reach would provide many benefits. The SRMS's limited reach required an additional boom to augment its reach during inspection of the belly of the Shuttle Orbiter in support of return to flight following the Columbia disaster. Berthing operations benefit from longer reach because visiting space craft are intercepted at a greater separation allowing more time to accomplish the berthing maneuver. This additional separation allows capture at higher delta V's, reduction in the interface forces as well as additional time to execute contingency options. If the SSRMS had a longer reach, fewer power data grapple fixtures would be required along the space station truss and the SSRMS could reach a larger percentage of the space station. Future large space structures, such as large telescopes, space solar power and fuel depots would benefit from a longer reach manipulator during construction, repair and upgrade operations.

The manipulator architecture of the SRMS and SSRMS has limited scalability. Longer manipulators require large diameter booms and massive motor gearbox combinations to actuate the hinges, driving up weight and reducing; packaging efficiency. In addition, the architecture does not lend itself to on-orbit repair, requiring the entire device to be returned to Earth for routine maintenance or repair. Further, the primary flexibility occurs at the hinges of these manipulators due to the collocation of the hinge drive gear system.

The structural efficiency of several column embodiments have been compared for space applications. Truss columns have been shown to be much more efficient than tubes as length and stiffness requirements increase, with tubular longeron trusses generally having higher efficiency than solid longeron trusses. Based on this, truss structures were used to develop long-reach manipulators such as the Space Crane. The Space Crane achieved a higher structural efficiency over the conventional boom/high-torque rotary hinge configuration by using trusses instead of cylindrical tubes for the links, and an offset linear-actuator/revolute hinge instead of a high-torque revolute hinge.

A manipulator is provided herein which provides improvements to existing structures and which overcomes the disadvantages presented by the prior art. Other features and advantages will become apparent upon a reading of the attached specification, in combination with a study of the drawings.

BRIEF SUMMARY OF THE INVENTION

A tension stiffened and tendon actuated manipulator is provided performing robotic-like movements when acquiring a payload. The manipulator design can be adapted for use in-space, lunar or other planetary installations as it is readily configurable for acquiring and precisely manipulating a payload in both a zero-g environment and in an environment with a gravity field. The manipulator includes a plurality of link arms, a hinge connecting adjacent link arms together to allow the adjacent link arms to rotate relative to each other and a cable actuation and tensioning system provided between adjacent link arms. The cable actuation and tensioning system includes a spreader arm and a plurality of driven and non-driven elements attached to the link arms and the spreader arm. At least one cable is routed around the driven and non-driven elements for actuating the hinge.

BRIEF DESCRIPTION OF THE SEVERAL VIEWS OF THE DRAWINGS

The organization and manner of the structure and operation of the invention, together with further objects and advantages thereof may best be understood by reference to the following description, taken in connection with the accompanying drawings, wherein like reference numerals identify like elements in which.

DETAILED DESCRIPTION OF THE INVENTION

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

A manipulator 20 has a plurality of link arms 22a, 22b, 22c which are connected together by hinges 24. The manipulator 20 has a cable actuation and tensioning system 26 which actuates the hinges 24 and stiffen the structure of the manipulator 20 in a modular fashion. The manipulator 20 achieves both high structural performance, as well as high dexterity by combining a number of tendon-actuated hinges 24 with extendable-length link arms 22a, 22b, 22c to form the manipulator 20. Each hinge 24 provides for relative motion between the link arms 22a, 22b and 22b, 22c attached thereto.

The manipulator 20 has long reach, high payload mass/tip force capability, high stiffness, precise positioning, system simplicity, and high reliability while also being lightweight and packaging efficiently. The cable actuation and tensioning system 26 increases the stiffness of the manipulator 20, without increasing tube diameter of the link arms 22a, 22b, 22c, thus still allowing for efficient packaging.

The manipulator 20 is, in general, a component assembly for use in a variety of larger assemblies that can perform robotic-like movements when acquiring and/or manipulating a payload. These larger assemblies utilizing manipulator 20 are ideally suited for in-space use or planetary installations as they are readily configurable for acquiring and precisely manipulating a payload. However, the present invention is not limited to these applications as it could also be used for Earth-based operations.

The manipulator 20 has at least two link arms 22a, 22b, 22c, with adjacent arms 22a, 22b/22b, 22c being joined together by hinge 24, the cable actuation and tensioning system 26 provided at each hinge 24. The adjacent link arms 22a, 22b/22b, 22c are coupled to the respective hinge 24, as described herein. As many link arms/hinges as desired can be used; as a result, the manipulator 20 is modular. Each hinge 24 provides a degree-of-freedom, such that as many degrees of freedom as required can be provided.

Each link arm 22a, 22b, 22c is an elongated, stiff member that is coupled to the respective hinge 24 as described herein. Each link arm 22a, 22b, 22c can be solid, hollow, constructed as a truss, fixed or variable length, deployed, etc., without departing from the scope of the present invention. As shown, each link arm 22a, 22b, 22c is rectangular-shaped and has first and second outboard ends 28, 30, however, other shapes may be provided. A centerline extends between the first and second outboard ends 28, 30 of each link arm 22a, 22b, 22c. The first outboard end 28 (see FIG. 15) of the first arm 22a is rigidly coupled to a base end 29 that is attached to a stationary structure 31, for example a spacecraft, a space station (stationary relative between the arms and the structure; the spacecraft or space station is not stationary relative to the planetary surface), planetary station, etc.; the second outboard end 30 at the outermost arm (the arm furthest away from the stationary structure) has a tip which is free and serves as the mounting location for a payload holding device 33 (e.g., effector end, hook, grabber arm, bucket, scoop, platform, electromagnet, etc.) coupled thereto or incorporated therewith. For adjacent link arms 22a, 22b, the second outboard end 30 of link arm 22a and the first outboard end 28 of link arm 22b are attached to the hinge 24 between arms 22a, 22b; for adjacent link arms 22b, 22c, the second outboard end 30 of link arm 22b and the first outboard end 28 of link arm 22c are attached to the hinge 24 between arms 22b, 22c.

Each cable actuation and tensioning system 26 includes at least one spreader arm 32 extending from the respective hinge 24, at least one driven element, such as a capstan 34 or a hoist 36, at least one non-driven elements, such as pulleys 38, 40, 42 or wheel 37, at least one cable routed around the driven and non-driven elements as described herein, and at least one motor 46 which drives the driven element. The driven and non-driven elements are attached to the link arms 22a, 22b/22b, 22c and spreader arm(s) 32. The ends of the spreader arm(s) 32 can be configured to engage the cables to allow the cables to slide therealong, without the use of pulleys.

Each cable is a fixed-length member which has its length fixed prior to operation of the manipulator 20. If desired, each cable can incorporate a length adjustment feature (e.g., removable section, turnbuckle, etc.) that allows the lengths to be adjusted after installation with the link arms 22a, 22b, 22c.

A pair of tensioning members 50a, 50b, which are preferably springs, may also be provided in each cable actuation and tensioning system 26. The driven element and the non-driven elements are attached to (or provided as part of if the non-driven elements are the ends of the spreader arms 32) the link arms 22a, 22b, 22c and the spreader arms 32 as discussed herein to effect movement of the one link arm relative to the adjacent link arm. Illustrative examples of possible arrangements of the cable actuation and tensioning systems 26 are shown, however, it is to be understood that these shown arrangements are illustrative only, and that there are many additional varieties of arrangements that can be used. The critical aspect is that the cable actuation and tensioning system 26 provides a driven element on one or more of the arms (link arm or spreader arm) which is remote from the hinge 24, with non-driven elements coupled to (or provided as part of) the other arms which are remote from the hinge 24, and that the driven member is used to circulate the cables using the non-driven members. When the cable actuation and tensioning system 26 is used to control the hinge 24, the cables and tensioning members must be arranged in an antagonistic manner to provide bi-directional hinge motion.

Each spreader arm 32 is a stiff member that is coupled to the hinge 24. Each spreader arm 32 can be solid, hollow, constructed as a truss, fixed or variable length, deployed, etc. without departing from the scope of the present invention. As shown, the spreader arms 32 can take a variety of shapes, e.g. elongated rectangular-shaped, a pair of triangles forming an elongated member, a wheel 37. Each spreader arm 32 has a pair of outboard ends 52, 54 upon which either the driven or non-driven members are mounted or provided, and a centerline extends between the outboard ends 52, 54. The spreader arms 32 provide mechanical advantage about the hinge 24. A single spreader arm 32 above and below the hinge 24 can be used, or multiple spreader arms can be used depending on design requirements.

Figures 1, 2:
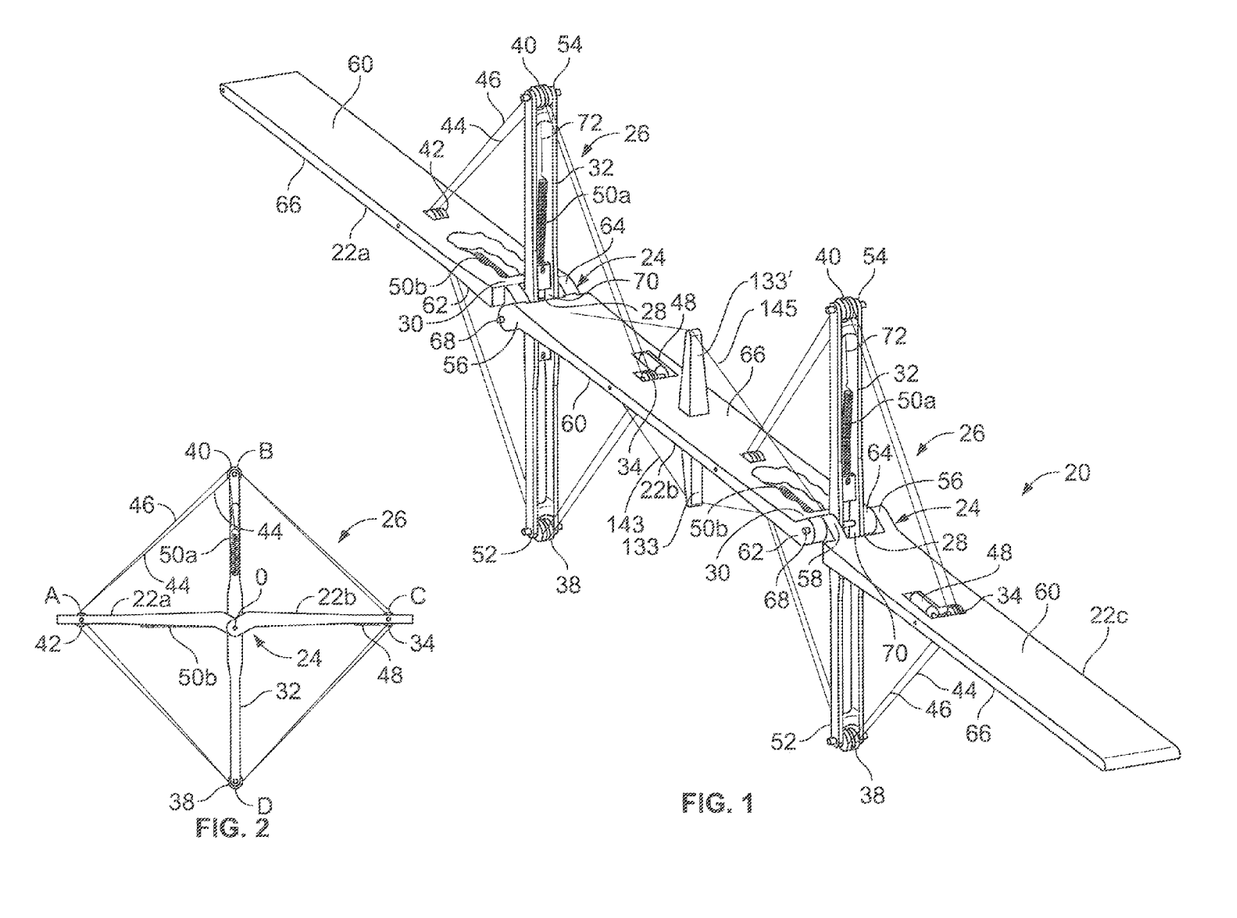
FIG. 1 is a perspective view of a first embodiment of a manipulator which incorporates features of the present invention.
FIG. 2 is a side elevation view of the manipulator of FIG. 1.

Attention is invited the embodiment of the manipulator 20 shown in FIGS. 1 and 2. Two hinges 24 and three link arms 22a, 22b, 22c are shown, however, any number and size of hinges 24 and link arms 22a, 22b, 22c can be combined based on the requirements of a particular application. The base end 29 and tip which serves as the mounting location for a payload holding device 33 are not shown in these Figures.

A pair of first spaced apart ears 56, 58 are provided at the first outboard end 28 of each link arm 22a, 22b, 22c. The first ears 56, 58 are enlarged and extend from a first surface 60 of the link arms 22a, 22b, 22c. Each first ear 56, 58 has an aperture there which are aligned with each other. The apertures through the ears 56, 58 are offset from the centerlines of the link arms 22a, 22b, 22c. A pair of second spaced apart ears 62, 64 are provided at the second outboard end 30 of each link arm 22a, 22b, 22c. The second ears 62, 64 are enlarged and extend from a second surface 66 of the link arms 22a, 22b, 22c. Each second ear 62, 64 has an aperture therethrough which are aligned with each other. The apertures through the ears 62, 64 are offset from the centerlines of the link arms 22a, 22b, 22c.

To couple the link arms 22a, 22b, 22c together, the link arms 22a, 22b, 22c are aligned such that the second end 30 of link arm 22a is proximate to the first end 28 of link arm 22b, and the second end 30 of link arm 22b is proximate to the first end 28 of link arm 22c. When placed end-to-end, the first surface 60 of link arm 22a, the second surface 66 of link arm 22b, and the first surface 60 of link arm 22c are flush, or substantially flush, with each other; the second surface 66 of link arm 22a, the first surface 60 of link arm 22b, and the second surface 66 of link arm 22c are flush, or substantially flush, with each other. As a result, the centerlines of the link arms 22a, 22b, 22c are aligned with each other (additional link arms would also alternate in this manner). The ears 62, 64 at the second end 30 of link arm 22a interengage with the ears 62, 64 at the first end 28 of link arm 22b such that the apertures align with each other. A pivot pin 68 is mounted through these aligned apertures to allow the link arms 22a, 22b to rotate relative to each other to form a hinge. Accordingly, the pivot pin 68 is offset from the centerlines of the link arms 22a, 22b, 22c. The ears 62, 64 at the second end 30 of link arm 22b interengage with the ears 56, 58 at the first end 28 of link arm 22c such that the apertures align with each other. A pivot pin 68 is mounted through these aligned apertures to allow the link arms 22b, 22c to rotate relative to each other to form a hinge. Accordingly, the pivot pin 68 is offset from the centerlines of the link arms 22a, 22b, 22c. Each pivot pin 68 defines an axis of rotation for the adjacent link arms 22a, 22b and 22b, 22c. It is to be understood that other hinge structures can be provided in each of the embodiments to allow the articulation of the hinge 24.

The innermost ears 58, 64 are spaced apart from each other such that a spreader aperture 70 is formed therebetween in which the spreader 32 is mounted. The spreader arm 32 has a passageway at its center through which the pivot pin 68 extends.

The hinge 24 between link arms 22a, 22b is described with the understanding that the other hinges 24 provided in the manipulator 20 are identical in structure (of course, each hinge 24 can vary in size).

The spreader arm 32 has a rotatable pulley 38, 40 mounted at each of its ends 52, 54. Apertures are provided in the spreader arm 32 to reduce weight, to provide a mounting location for a spring 50a mounted on one side of the spreader arm 32, and to allow continuous internal wire paths. A first end of the spring 50a is affixed to the spreader arm 32 proximate to the end of the aperture 72 which is proximate to the center of the spreader arm 32, and the spring 50a extends along the centerline of the spreader arm 32.

A rotatable pulley 42 is mounted in an aperture in the link arm 22a proximate to, but spaced from, the second outboard end 30. A driven capstan 34 is mounted in an aperture in the link arm 22b proximate to, but spaced from, the first end 28. A motor 48 is mounted on the link arm 22b proximate to, but spaced from, the first end 28, and drives the capstan 34 as discussed herein.

A spring 50b has an end attached to the link arm 22a proximate to the hinge 24 and extends along the centerline of the link arm 22a. (The apertures shown in FIG. 1 above the spring 50b can be provided, or can be eliminated).

In this embodiment, the capstan 34 and the pulleys 38, 40, 42 are located equidistant from the hinge axis defined by the pivot pin 68 and a single capstan 34 is located along one of the link arms 22b to actuate the hinge 24 (the capstan 34 and the pulleys 38, 40, 42 do not need to be located equidistant from the hinge axis). The capstan 34 has two warping end profiles at different diameters for actuation. The springs 50a, 50b are used to accommodate changes in the total cable path as the hinge 24 articulates. In this embodiment, the cables 44, 46 are used as the primary tension element, however, a variety of approaches may be taken such as fixed rods, telescoping members or tapes, etc.

FIG. 2 provides a side elevation view of the hinge 24 described in FIG. 1. In this embodiment, the springs 50a, 50b are used to provide the antagonistic force. The two tension cables 44, 46 form two loops; one cable 44 pulls the 54 of the spreader arm 32 at B toward the capstan 34 at C, and the second cable 46 pulls the link arm 22a, via a connection at A, toward the capstan 34 at C on link arm 22b. Cable 44 is anchored on the spreader arm 32 at B, proceeds clockwise around the capstan 34 at C on the inner radius of the capstan 34, proceeds over pulley 38 at D, proceeds over pulley 42 at A, proceeds over pulley 40 at B, and proceeds down to the spring 50a and is attached thereto. Cable 46 is anchored at to the link arm 22a at A, proceeds clockwise over pulley 40 at B, proceeds around capstan 34 at C, proceeds over pulley 38 at D, proceeds over pulley 42 at A, and is attached to the spring 50b on link arm 22a.

The hinge articulation, i.e. control of the angle AOC, is accomplished by rotating the capstan 34. The angle AOC can range from 0 degrees to 315 degrees, in this example. When the capstan 34 is rotated clockwise, the angle AOC decreases as point B is drawn toward point C via cable 44 and point A is drawn toward point C via cable 46. To balance motion of each link arm 22a, 22b, relative to the spreader arm 32, the capstan 34 for cable 46 has twice the diameter of the capstan 34 for the cable 44. When the capstan 34 is rotated counter-clockwise, the spreader 32 at B moves away from the capstan 34 at C due to the action of the tensioning springs 50a, 50b which apply a restoring force, thus causing the angle AOC to increase.

The geometry of the link arms 22a, 22b and the spreader arm 32 are such that the thickness of the link arm 22a, 22b is accommodated to enable to the angle AOC to be 0 degrees to 315 degrees, in this example.

In this configuration, extra pulleys are used to balance the loads were the cables 44, 46 react on the springs 50a, 50b. For example, cable 44 could be arranged so that it is anchored at B goes around the capstan 34 at C, over pulley 38 at D and then terminates on a spring (not shown) between D and O. This cable routing eliminates pulley 42 at A and the additional cable from D to A, but results in unbalanced load at D and A.

FIG. 1 also provides a tension network from of a pair of fixed spreader arms 133, 133' which provide a mounting locating for a pair of tensioning cables 143, 145. As shown, the fixed spreader arms 133, 133' extend from the center of the link arm 22b. Spreader arm 133 extends from first surface 60, and spreader arm 133' extends from second surface 66. The ends of cable 143 are attached proximate to the outboard ends 28, 30 of the link arm 22b and extend over the end of the spreader arm 133. The ends of cable 145 are attached proximate to the outboard ends 28, 30 of the link arm 22b and extend over the end of the spreader arm 133. This tension network aids in stiffening the link arm 22b. This stiffening complements the stiffening provided by the tension network provided by the cable actuation and tensioning systems 26. Depending upon requirements, either tension network or a combination of these tension networks may be used.

Figure 3:
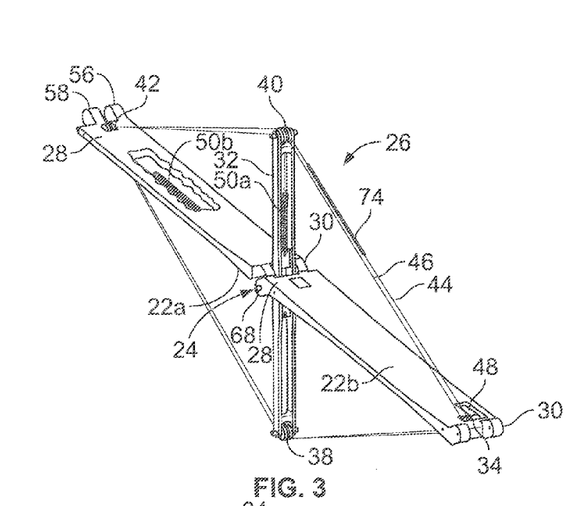
FIG. 3 is a perspective view of a second embodiment of two links and a joint of a manipulator which incorporates features of the present invention.

FIG. 3 shows the hinge 24 of FIGS. 1 and 2, but with the pulley 42 at the first end 28 of link arm 22*a* and the capstan 34 at the second end 30 of link arm 22*b*. As a result, the distance from A to O and the distance from B to O does not need to be equal as is provided in FIGS. 1 and 2. This embodiment also shows that a portion of cable 44 is formed by a solid, non-bending tension rod 74. Solid tension rods 74 provide advantages in weight and packaging in some applications. A tension rod(s) 74 can be used in any of the embodiments disclosed herein.

Figure 4:
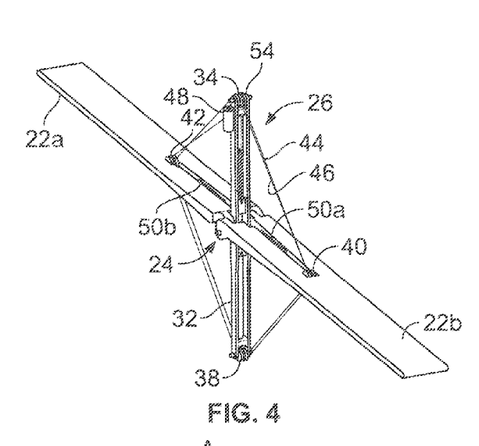
FIG. 4 is a perspective view of a third embodiment of two links and a joint of a manipulator which incorporates features of the present invention.

FIG. 4 shows the hinge 24, with the capstan 34 and associated motor 48 mounted on the end 54 of spreader arm 32, and with the pulley 40 and its associated spring 50*a* mounted on link arm 22*b*. The dual capstan 34 warping end profiles may be the same diameter, or have different diameters.

Figure 5:
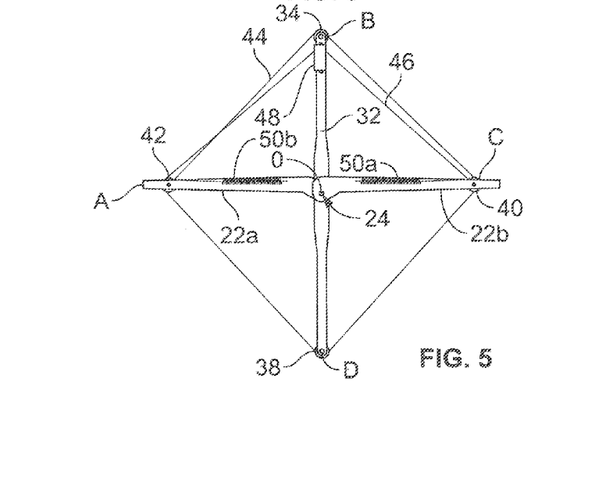
FIG. 5 is a side elevation view of the manipulator of FIG. 4.

FIG. 5 provides a side elevation view of the hinge 24 shown in FIG. 4. The dual capstan 34 provided at the end 54 of the spreader arm 32 articulates the hinge 24. Two tension cables 44, 46 are provided. The first cable 44 is anchored on link arm 22*a* at A, proceeds clockwise around the capstan 34 at B, proceeds around pulley 40 at C, proceeds around pulley 38 at D, proceeds around pulley 42 at A, and terminates on the tensioning spring 50*b* on link arm 22*a* which is located between A and O. The second cable 46 is anchored on link arm 22*b* at C, proceeds clockwise around the capstan 34 at B, proceeds around pulley 42 at A, proceeds around pulley 38 at D, proceeds around pulley 40 at C, and terminates on the tensioning spring 50*a* on link arm 22*b* which is located between C and O.

Like the first embodiment, the hinge articulation, i.e. control of the angle AOC, is accomplished by rotating the capstan 34. The angle AOC can range from 0 degrees to 315 degrees, in this example. Clockwise rotation of the capstan 34 at B causes the angle AOC to decrease, while counterclockwise rotation of the capstan 34 at B causes the angle AOC to increase.

Figure 6:
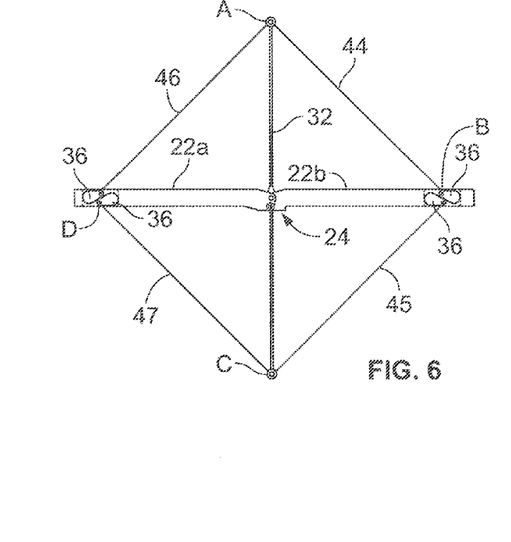
FIG. 6 is a side elevation view of a fourth embodiment of a manipulator which incorporates features of the present invention.

FIG. 6 provides four hoists 36 and associated motors which actuate the hinge 24 by operating in an antagonistic manner, much like the muscles in as human arm. The hoists 36 are motorized and pays out/retrieves the cables 44, 45, 46, 47 between B and A, B and C, A and D, C and D, respectively.

Figure 7:
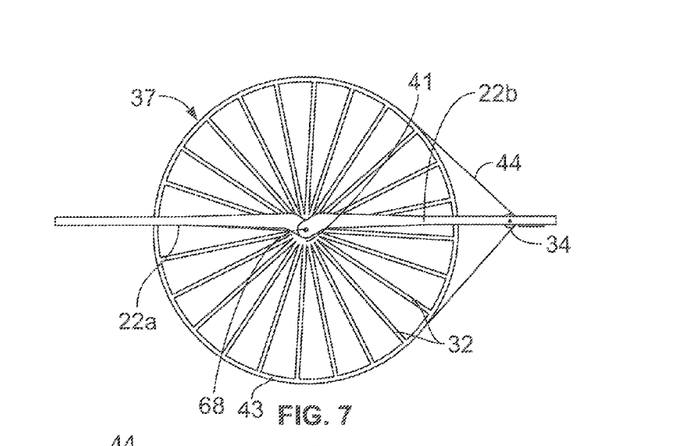
FIG. 7 is a side elevation view of a fifth embodiment of a manipulator which incorporates features of the present invention.

In FIG. 7, the capstan 34 is provided on link arm 22*b* and the spreader arm and pulleys have been combined into a wheel 37 which has a plurality of spreader arms 32 extending from a central hub 41 to an outer ring 43 which acts like a pulley around which the cable 44 circulates. The hinge 24 connects to the central hub 41 by a pivot pin 68. The wheel 37 is connected to link arm 22*a* such that link arm 22*a* rotates with the wheel 37. The cable 44 routes around the outer surface of the ring 43 and around the capstan 34. As the capstan 34 is driven, the wheel 37 rotates and moves link arm 22*a* toward link arm 22*b*.

Figure 8:
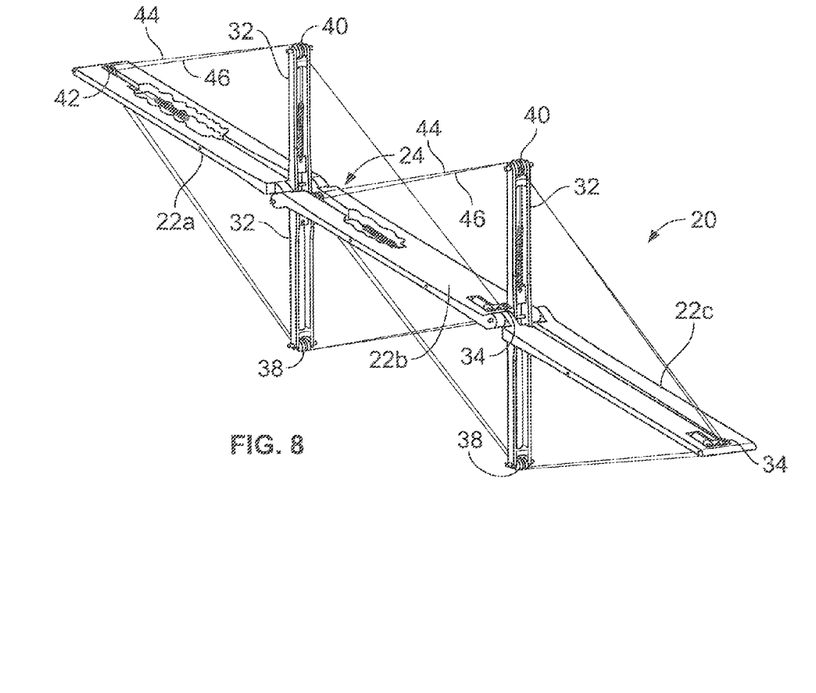
FIG. 8 is a perspective view of a sixth embodiment of a manipulator which incorporates features of the present invention.
Figure 9A:
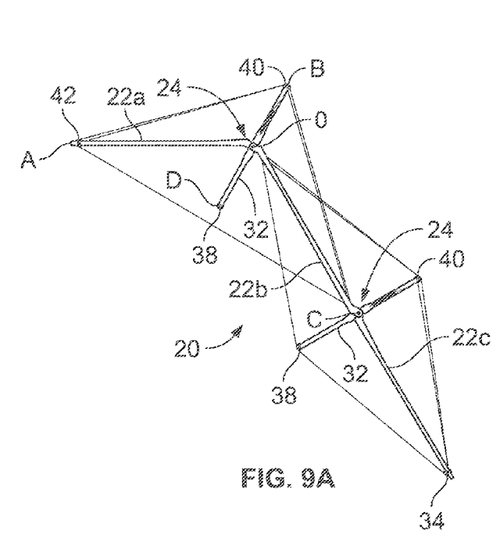
FIG. 9A is a side elevation view of the manipulator of FIG. 8 in an articulated position.
Figure 9B:
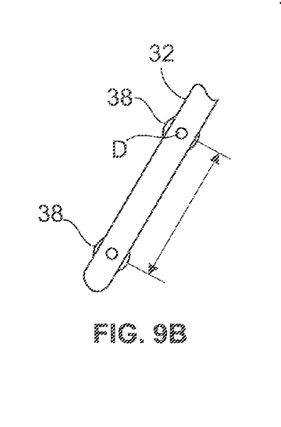
FIG. 9B is side elevation view of a portion of the manipulator showing a constrained lift-off configuration.

FIGS. 8 and 9 show the hinge 24 of FIG. 3, but without the tension rod 74. In FIGS. 3, 8 and 9, the cables 44, 46 have been extended to span the entire length of the link arms 22*a*, 22*b* and link arms 22*b*, 22*c*, moving the pulley 42 and capstan 34 of each hinge 24 toward the outboard ends 28, 30 of the respective link arms 22*a*, 22*b*, 22*c*. Thus, the cables 44, 46 serve the dual purpose of hinge articulation and link stiffening. As shown in FIG. 9A, as the hinge 24 articulates, the mechanical advantage provided by the spreader arm 32 is reduced. As the hinge 24 continues to articulate clockwise, the angle BOC decreases, decreasing the mechanical advantage the cables 44, 46 can exert about the hinge axis O. On one side of the hinge 24, this effect can be alleviated by allowing the lift-off of the spreader arm 32. In this embodiment, the cables 44, 46 which were originally in contact with the pulley 38 at D lift-off of the spreader arm 32 which results in significant mechanical advantage of the cables 44, 46 between AC about hinge O. Lift-off occurs just after the points ADC become co-linear as the hinge 24 articulates. Lift-off causes the cables 44, 46 to sweep through a larger portion of the workspace, which may be undesirable. This can be remedied by constraining the degree of lift-off, for example a limited travel telescoping spreader between O and D. FIG. 9B shows a possible containment arrangement with additional pulley 38 placed to constrain the cables 44, 46 after the lift-off. The pulley 38 re-engages with the cables 44, 46 when the hinge 24 is articulated in the reverse direction. This distance at which the cable 44, 46 is constrained is shown by the arrow in FIG. 9B. This distance can vary depending upon the desired application.

Figures 10, 11, 12:
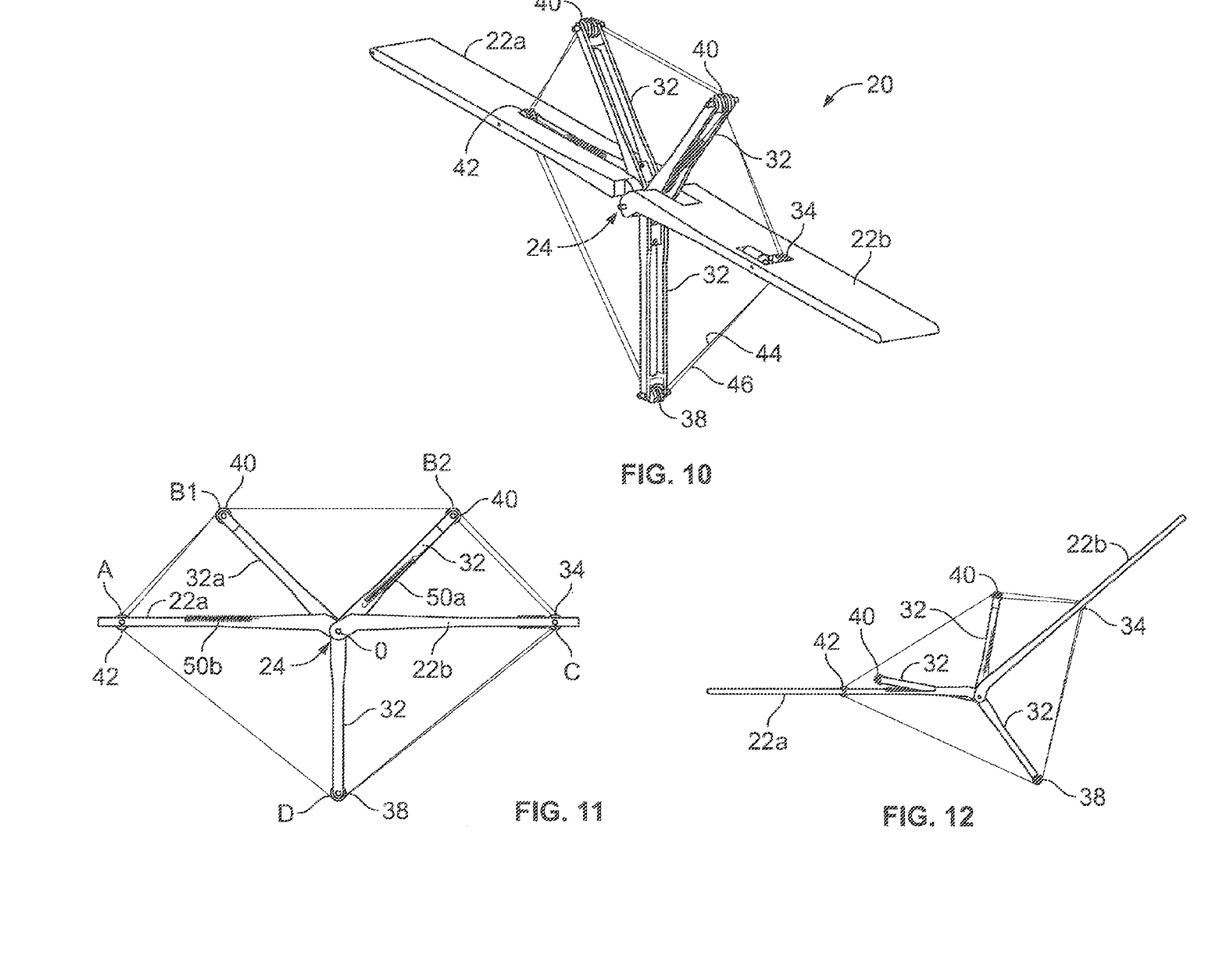
FIG. 10 is a perspective view of an seventh embodiment of a manipulator which incorporates features of the present invention.
FIG. 11 is a side elevation view of the manipulator of FIG. 10.
FIG. 12 is a second side elevation view of the manipulator of FIG. 10 in an articulated position.

In order to maintain the mechanical advantage along the top side of the hinge 24 in FIG. 9, i.e. along tension path ABC, additional spreader arms 32 can used as is shown in FIG. 10. The additional spreader arm 32*a* supports the cables 44, 46 at B1 and B2 as the hinge 24 articulates. Operational requirements determine how many spreader arms are needed and if it is sufficient to only add the additional spreaders above the hinge 24 as shown in FIGS. 10-12. Spreader arms, correctly located, are one approach to minimizing changes in the cable 44, 46 length as the hinge 24 articulates which reduces the stroke required for the springs 50*a*, 50*b*.

Figure 13:
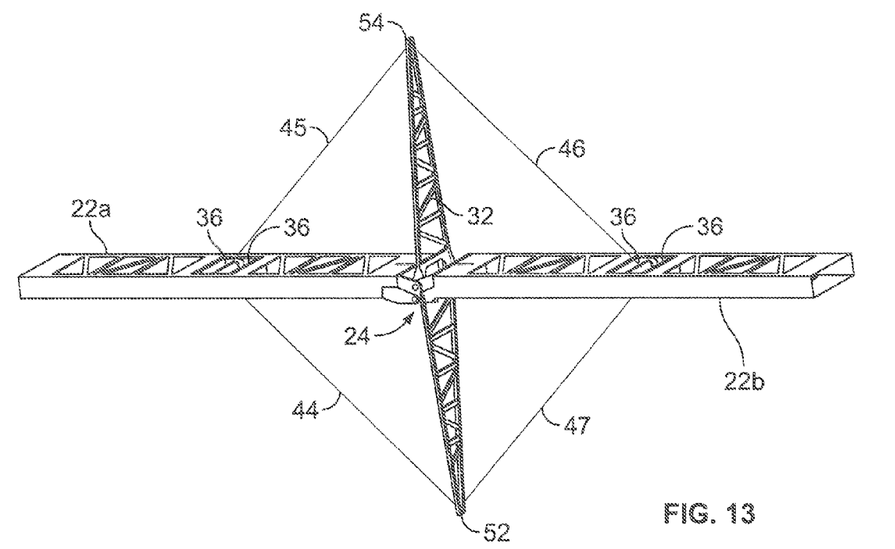
FIG. 13 is a perspective view of a eighth embodiment of a manipulator which incorporates features of the present invention.
Figure 14:
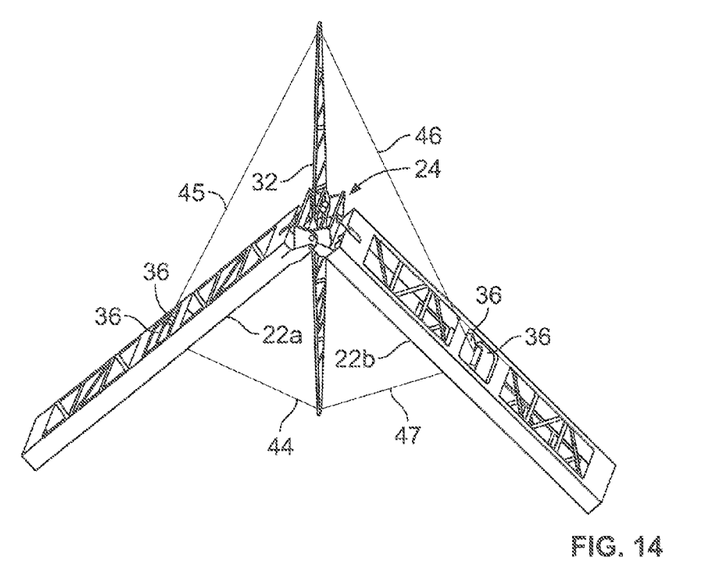
FIG. 14 is a perspective view of the manipulator of FIG. 13 in an articulated position.

FIGS. 13 and 14 show a hinge 24 which has the link arms 22*a*, 22*b* and the spreader arm 32 provided therebetween. A pair of hoists 36 are mounted in each link an 22*a*, 22*b*. In this embodiment, four cables 44, 45, 46, 47 are provided. Cable 44 extends from one of the hoists 36 in link arm 22*a* to the end 52 of the spreader arm 32 and is affixed to the end 52 of the spreader arm 32. Cable 45 extends from the other of the hoists 36 in link arm 22*a* to the end 54 of the spreader arm 32 and is affixed to the end 54 of the spreader arm 32. Cable 46 extends from one of the hoists 36 in link arm 22*b* to the end 54 of the spreader arm 32 and is affixed to the end 54 of the spreader arm 32. Cable 47 extends from the other of the hoists 36 in link arm 22*b* to the end 52 of the spreader arm 32 and is affixed to the end 52 of the spreader arm 32.

The hinge 24 is articulated by engaging the motors driving the hoists 36 to increase the length of, or decrease the length of the appropriate cables 44, 45, 46, 47 to articulate the hinge 24 as shown in FIG. 14. The motors driving the hoists 36 are arranged in an antagonistic relationship.

Figure 15:
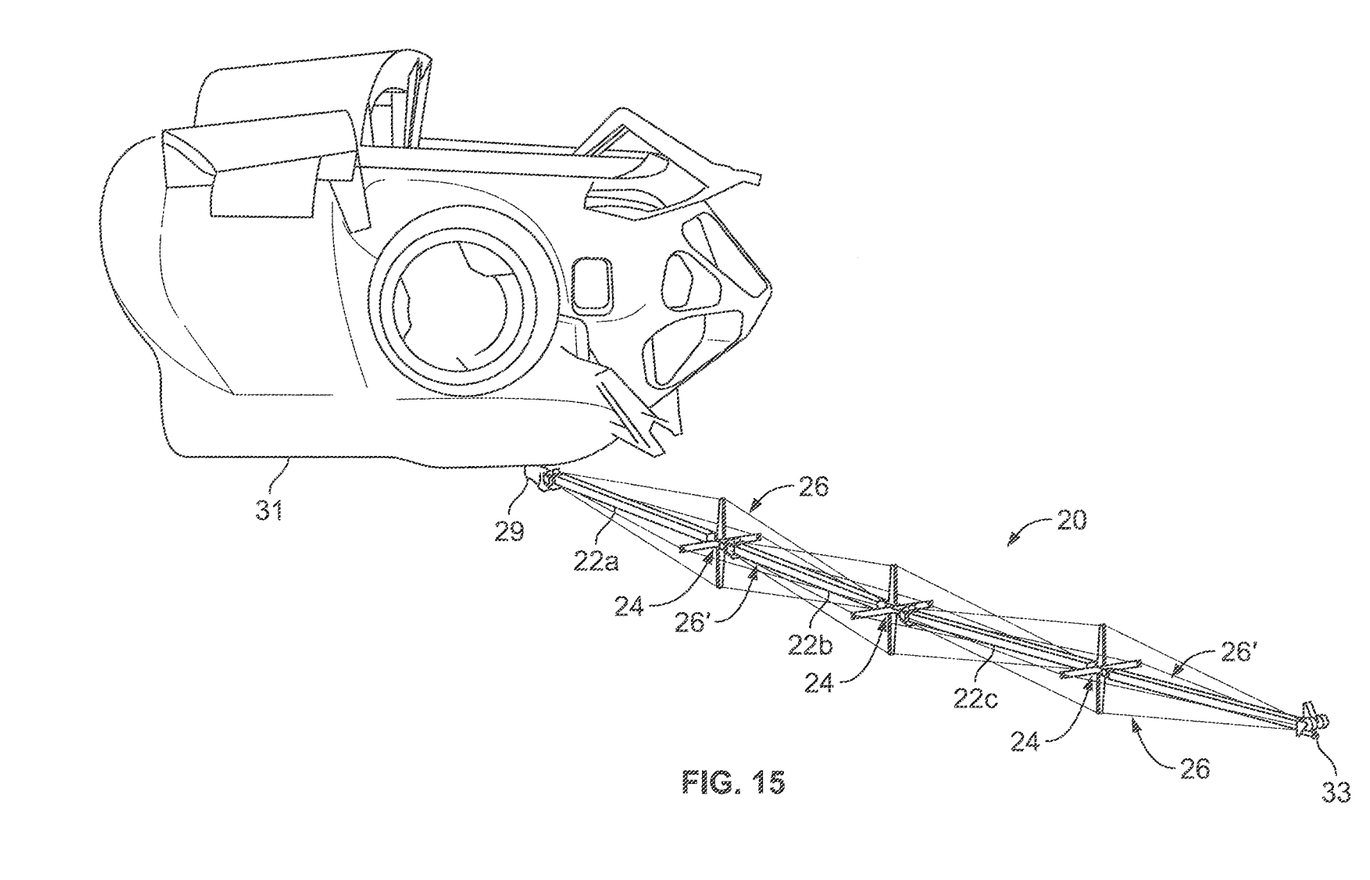
FIG. 15 is a perspective view of a ninth embodiment of a manipulator which incorporates features of the present invention.
Figure 16:
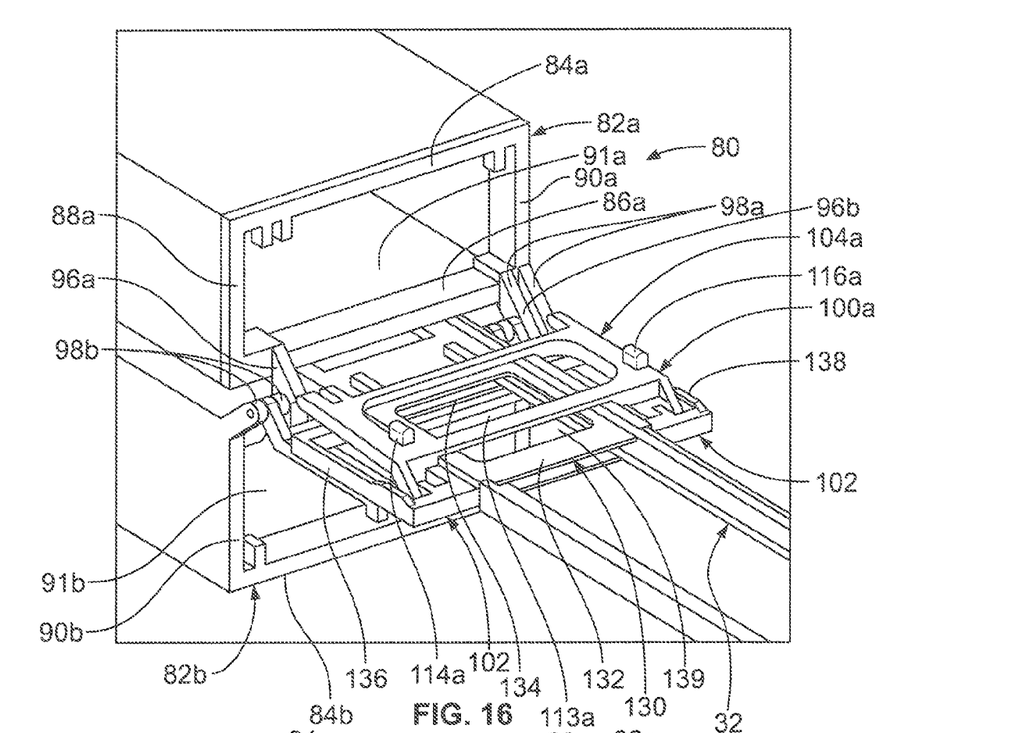
FIG. 16 is a perspective view of a hinge that can be used as the hinge in any of the embodiments of the manipulator.
Figure 17:
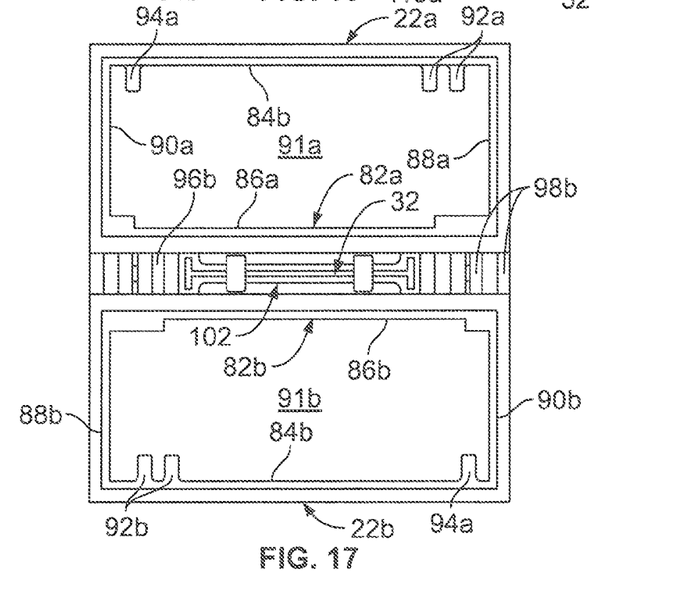
FIG. 17 is an end-on view of the hinge of FIG. 16 in the packaged state.
Figure 18:
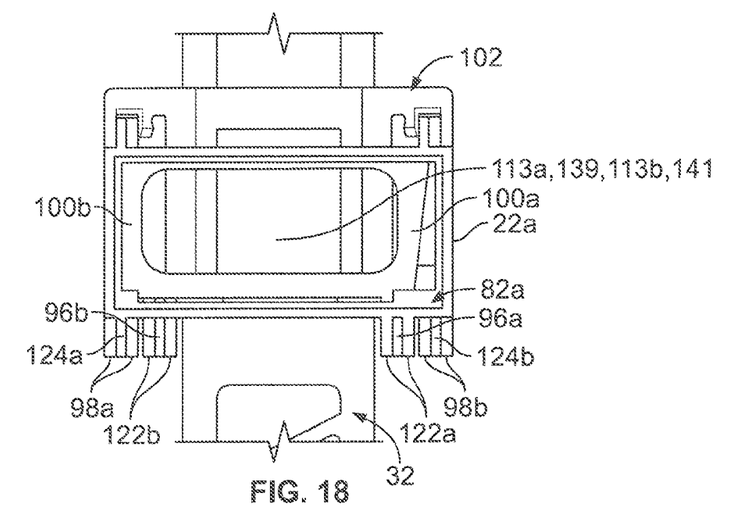
FIG. 18 is an end-on view of the hinge of FIG. 16 in the deployed state.
Figure 19:
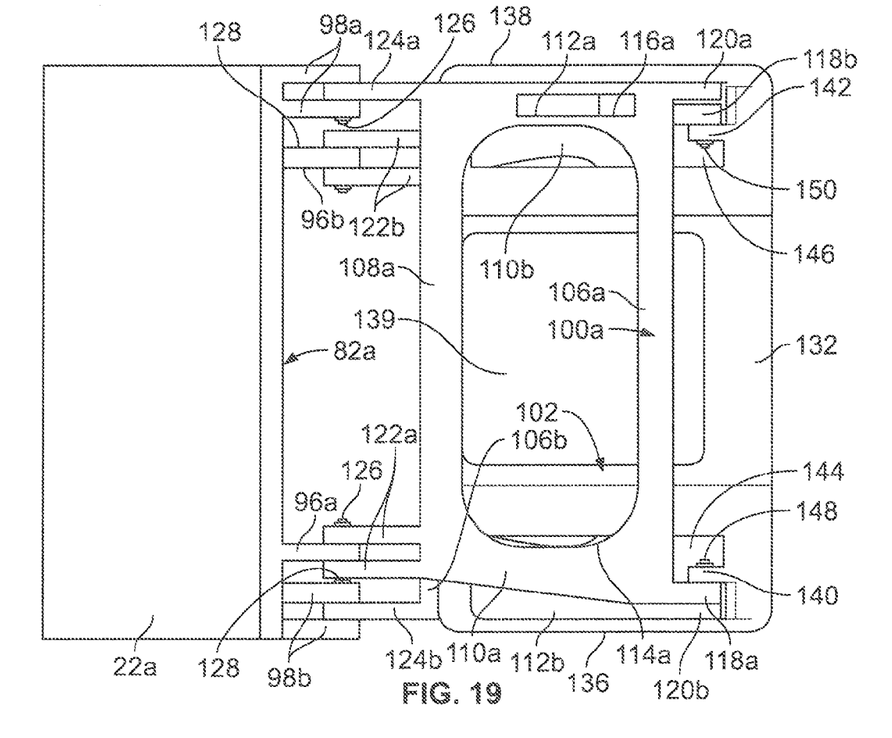
FIG. 19 is an alternate plan of view of the hinge of FIG. 16.

FIG. 15 shows a manipulator 20 which has a pair of orthogonal cable actuation and tensioning, systems 26, 26' provided for each hinge 24. In this embodiment, a first spreader arm extends from the adjacent link arms (for example, link arms 22*a*, 22*b*) at the hinge 24 in a direction which is perpendicular to the axis of rotation of the hinge 24 defined by pivot pin 68, and a second spreader arm extends from the adjacent link arms (for example, link arms 22*a*, 22*b*) perpendicular to the first spreader arm and extends from the axis of rotation of the hinge 24. In this embodiment, preferably, only one cable actuation and tensioning systems 26, 26' is driven; however, both cable actuation and tensioning systems 26, 26' can be driven, for example, if the single degree of freedom hinge 24 is replaced by a two degree of freedom hinge. In addition, cable actuation and tensioning system 26' can be driven to adjust pretension. The hinges 24 and the cable actuation and tensioning systems 26, 26' are provided such that the link arms 22*a*, 22*b*, 22*c*, 22*d* fold on each other (alternating folding), that is along parallel axes; or the cable actuation and tensioning systems 26, 26' are provided such that the link arms 22a, 22b, 22c, 22d fold on each other (alternating folding), that is along perpendicular axes. That is to say, the pivot axes of the hinges 24 can be either perpendicular or alternating perpendicular to each other along the length of the manipulator 20 to accomplish the desired folding. While a perpendicular folding arrangement is described, other angular geometries can be provided for the folding arrangement.

FIGS. 16-22 show a novel hinge 80 that can be used for the hinge 24 between adjacent link arms (shown as link arms 22a, 22b in these Figures for illustration purposes only) in any of the embodiments of the manipulator 20. While the hinge 80 is described for use in the manipulator 20, hinge 80 is not limited to such use; hinge. 80 can be used in a variety of structures to connect two components together. The hinge 80 is formed of a pair of frames 82a, 82b which are attached to the ends of the respective link arms 22a, 22b, a torque reaction tube 100a attached between the frame 82a and a central member 102, and a torque reaction tube 100b attached between the frame 82b and the central member 102. While the frames 82a, 82b are shown as separate members from the link arms 22a, 22b, the frames 82a, 82b can be formed as an integral part of link arms 22a, 22b.

Link arm 22a is hollow and, as shown, has a rectangular cross-section (this is illustrative, other shapes can be provided). The frame 82a is attached to the end of the link arm 22a and can mirror the shape of the link arm 22a, or can take a different shape than the link arm 22a (an adaptor (not shown) may be provided to attach the frame 82a to the link arm 22a). As shown in these figures, the link arm 22a and the frame 82a are rectangular, and, as such, the frame 82a has a first portion 84a, a second portion 86a which is parallel to the first portion 84a, a third portion 88a which connects a first end of the first and second portions 84a, 86a together, and a fourth portion 90a which connects the opposite ends of the first and second portions 84a, 86a together. As such, a central passageway 91a is formed therein. The first portion 84a has a pair of retaining guides 92a which extend therefrom toward the centerline of the link arm 22a. The retaining guides 92a are formed as a pair of spaced apart flanges, which are proximate to but spaced from, the third portion 88a. The first portion 84a further has a retaining guide 94a which extends therefrom toward the centerline of the link arm 22a. The retaining guide 94a is formed as a flange which is proximate to, but spaced from, the fourth portion 90a. The second portion 82a has a first ear 96a which extends at an angle relative to the centerline of the link arm 22a and is proximate to the third portion 88a. The ear 96a has an aperture therethrough. The second portion 82a further has a pair of spaced-apart ears 98a which extend at an angle relative to the centerline of the link arm 22a and are proximate to the fourth portion 90b. Each ear 98a has an aperture therethrough. The apertures through the ears 96a, 98a are aligned with each other. As the ears 96a, 98a are angled relative to the centerline of the link arm 22a, the apertures are offset from the centerline of the link arm 22b.

Like link arm 22a, link arm 22b is hollow and, as shown, has a rectangular cross-section (this is illustrative, other shapes can be provided). The frame 82b is attached to the end of the link arm 22b and can mirror the shape of the link arm 22b, or can take a different shape than the link arm 22b (an adaptor (not shown) may be provided to attach the frame 82b to the link arm 22b). As shown in these figures, the link arm 22b and the frame 82b are rectangular, and, the frame 82b is the mirror image of frame 82a attached to link arm 22a and therefore, the same reference numerals with the suffix "b" are provided thereon, and the specifics are not repeated herein.

The torque reaction tube 100a has a rectangular frame 104a having a first portion 106a, a second portion 108a which is parallel to the first portion 106a, a third portion 110a which connects a first end of the first and second portions 104a, 106a together, and a fourth portion 112a which connects the opposite ends of the first and second portions 104a, 106a together. As such, a central passageway 113a is formed therein. Each of the third and fourth portions 110a, 112a has a retaining tab 114a, 116a extending therefrom. Each retaining tab 114a, 116a is proximate to the first portion 106a. The first portion 106a has a pair of ears 118a, 120a which extends at an angle relative to the frame 104a. Ear 118a aligns with the third portion 110a; ear 120a aligns with the fourth portion 112a. Each ear 118a, 120a has an aperture therethrough which are aligned with each other. The second portion 108a has a pair of spaced-apart ears 122a which extend at an angle relative to the frame 104a in the same direction as ears 118a, 120a. Ears 122a are proximate to the third portion 110a. The second portion 108a further has an ear 124a which extends at an angle relative to the frame 104a in the same direction as ears 118a, 120a. Ear 124a is proximate to the fourth portion 112a. Each ear 122a, 124a has an aperture therethrough which are aligned with each other.

The torque reaction tube 100a is attached to the frame 82a by ear 124a engaging between ears 98a with a pivot pin 126 inserted through the aligned apertures, and ear 96a engaging between ears 122a with a pivot pin 126 inserted through the aligned apertures. The torque reaction tube 100a is rotatable relative to the frame 82a.

Torque reaction tube 100b is attached to the frame 82b. Torque reaction tube 100b is the mirror image of torque reaction tube 100a and therefore, the same reference numerals with the suffix "b" are provided thereon, and the specifics are not repeated herein.

The torque reaction tube 100b is attached to the frame 82b by ear 124b engaging between ears 98b with a pivot pin 128 inserted through the aligned apertures, and ear 96b engaging between ears 122b with a pivot pin 128 inserted through the aligned apertures. The torque reaction tube 100b is rotatable relative to the frame 82b.

The central member 102 is formed of a rectangular frame 130 having a first portion 132, a second portion 134 which is parallel to the first portion 132, a third portion 136 which connects a first end of the first and second portions 132, 134 together, and a fourth portion 138 which connects the opposite ends of the first and second portions 132, 134 together. A pair of spaced-apart support bars 140, 142 extend between the first and second portions 132, 134 and are parallel to the third and fourth portions 136, 138. As such, a central passageway 139 is formed between the first and second portions 132, 134 and the support bars 140, 142; a first side passageway 144 is formed between support bar 140 and first, second and third portions 132, 134, 136; and a second side passageway 146 is formed between support bar 142 and first, second and fourth portions 132, 134, 138. The spreader arm 32 extends through a passageway formed through the first portion 132, the support bars 140, 142 and the second portion 134. The spreader arm 32 has central passageway 141 therethrough which aligns with the central passageways 113a, 139, 113b. The first portion 132 has a first ear 140 extending into side passageway 144, and a second ear 142 extending into side passageway 146. Each ear 140, 142 has an aperture therethrough which are aligned with each other.

The torque reaction tubes 100a, 100b are attached to the central member 102 by ear 140 engaging with ear 118a and with ear 120*b* with a pivot pin 148 inserted through the aligned apertures, and by ear 142 engaging with ear 118*b* and with ear 120*a* with a pivot pin 150 inserted through the aligned apertures. The torque reaction tubes 100*a*, 100*b* are rotatable relative to the central member 102.

Figure 20:
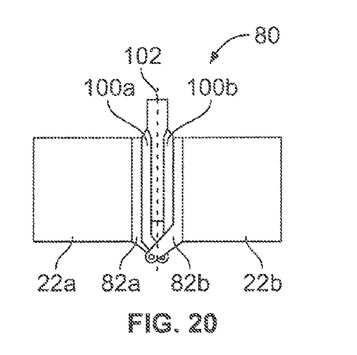
FIG. 20 is an elevation view of the hinge of FIG. 16 in a first position.
Figure 21:
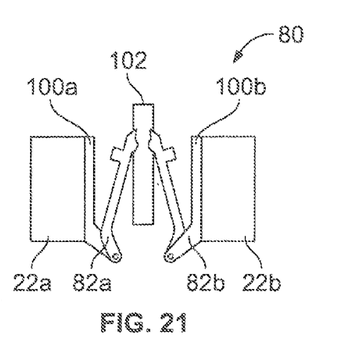
FIG. 21 is an elevation view of the hinge of FIG. 16 in an exaggerated position.
Figure 22:
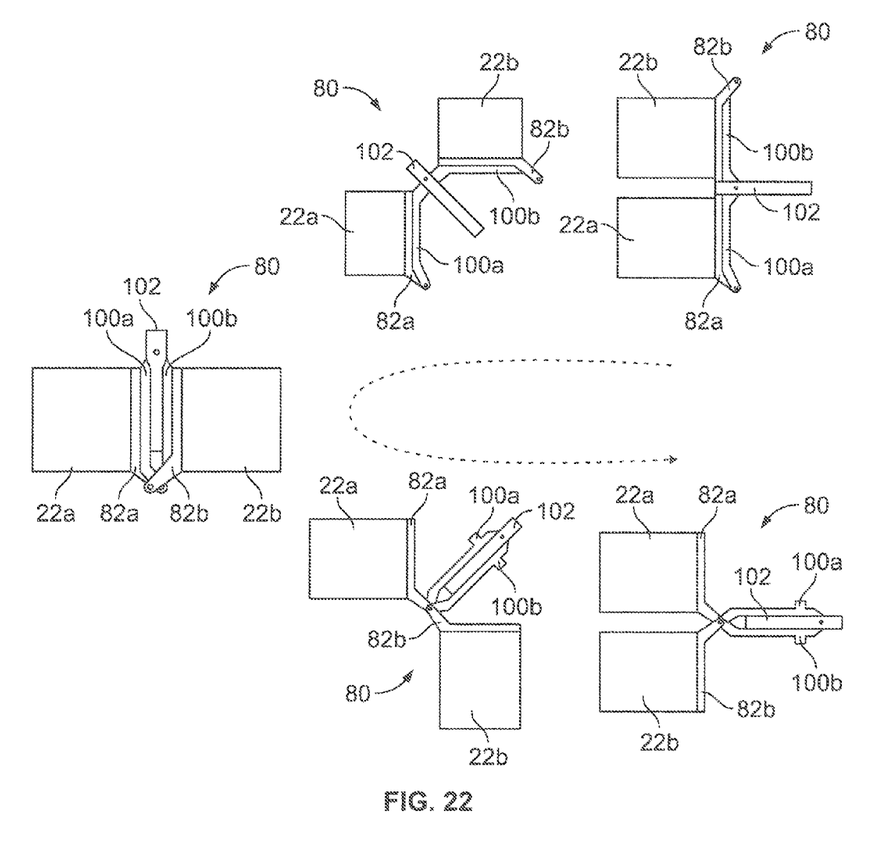
FIG. 22 contains sequence of elevation views of the hinge of FIG. 16 showing various positions as it articulates.

The link arms 22*a*, 22*b* can rotate 360 degrees relative to each other as shown in FIG. 22. As shown in FIG. 20, the link arms 22*a*, 22*b* are aligned with each other. As the link arms 22*a*, 22*b* are rotated by the cable actuation and tensioning system 26, the link arms 22*a*, 22*b* rotate via hinge 80. The torque reaction tubes 100*a*, 110*b* pivot relative to the central member 102 and the frames 82*a*, 82*b* to enable the hinge 80 to be anywhere from 0 degrees to 360 degrees as shown in FIG. 22. When the hinge 80 is in the 0 degree position, the link arms 22*a*, 22*b* are side-by-side, the torque reaction tubes 100*a*, 100*b* are engaged with the frames 82*a*, 82*b* (the tabs 114*a*, 116*a* engage with the retaining guides 92*a*, 94*a*; the tabs 114*b*, 116*b* engage with the retaining guides 92*b*, 94*b*), and the spreader arm guide 102 is perpendicular to the torque reaction tubes 100*a*, 100*b*. When the hinge 80 is in the 180 degree position, the link arms 22*a*, 22*b* are aligned with each other, the torque reaction tubes 100*a*, 100*b*) are engaged with the frames 82*a*, 82 (the tabs 114*a*, 116*a* engage with the retaining guides 92*a*, 94*a*; the tabs 114*b*, 116*b* engage with the retaining guides 92*b*, 94*b*), and the spreader arm guide 102 is sandwiched between the torque reaction tubes 100*a*, 100*b*. When the hinge 80 is in the 360 degree position, the link arms 22*a*, 22*b* are side-by-side, the torque reaction tubes 100*a*, 100*b*) are disengaged from the frames 82*a*, 82, and the spreader arm guide 102 is sandwiched between the torque reaction tubes 100*a*, 100*b*.

The hinge 80 prevents loads from the spreader arm 32 from causing hinge 24 to separate (i.e. a vertical positive or negative force acting through pivot pins 126, 128, 146, 148). This is accomplished by the location of the pins 126, 128 over the centerline of the hinge 80 as shown in FIG. 20, and the location of pins 146, 148 on the centerline. The symmetric design of the hinge 80 reduces number of unique parts.

The central passageways 113*a*, 139, 113*b* provides a large pass through for wires: which remains unobstructed during deployment and operation of the manipulator 20. The size of the central passageways 113*a*, 139, 113*b* may be adjusted due to requirements on the spreader arm geometry. The hinge 80 is scalable for different dimensioned cross-sections as well as directly applicable to other cross-sectional geometries, such as circular, triangular, hexagonal, etc.

The central member 102 can be synchronized to bi-sect angle (or follow many other relations) involving the location of link arm 22*a* relative to link arm 22*b*. The hinge 80 can be augmented to have a preload across the hinge 80 to prevent pulling-apart of the hinge 80 under tension. The preload force is provided by the cable tension in a cable articulated hinge. The over center hinge lines prevent spreader compression from spreading the hinge 24.

The hinge 80 supports a deployable central link (i.e. the spreader arm 32 in this embodiment) which is restowable. The central member 102 can be modified to accommodate any spreader arm 32 cross-section geometry.

The tabs 114*a*, 116*b* and ears 92*a*, 92*b*, 94*a* react to torques on the hinge 80 and improve the stiffness of the hinge 80.

As shown in FIG. 22, when the link arms 22*a*, 22*b* are side-by-side, two different folding patterns are provided. This allows for multiple packaging options during stowage.

In addition, this hinge 80 reduces the internal wiring bundle length to accommodate the full 360 degree rotation compared to a traditional hinge joint, because the rotation effectively occurs around the cross-section center line instead of the hinge axis as a result of the joint geometry. This requires less slack in the wire bundle during articulation than a conventional hinge.

In each embodiment, while tensioning by cables are shown and described herein, it is to be understood that the tensioning can be accomplished in a variety of ways, including, but not limited to cables, metallic tapes, rigid bar, springs, etc. or some combination of these approaches.

In each embodiment, actuating the hinges 24 of the manipulator 20 through the cable actuation and tensioning system 26 provides a large mechanical advantage for the motor 48 that actuates the hinge 24, enabling use of smaller, lighter-weight motors, thus requiring less power. Low precision motors can be used because the cable actuation and tensioning system 26 can be designed to damp out irregularities in the motor torque, further reducing motor complexity and costs. A single motor 48 is preferably used per hinge 24, however, multiple motors 48 per hinge 24 operating in an antagonistic manner can be provided, depending on the performance or redundancy required. In addition, since the motors 48 are located away from the mechanical hinge formed by pivot pin 68 forming the hinge 24, this simplifies the mechanical design and enables straight forward on-orbit repair because removal of the motor does not affect the hinge angle. Further, the cable actuation and tensioning system 26 increases the stiffness of the link arms 22*a*, 22*b*, 22*c*, providing for a smaller, lighter-weight system.

In each embodiment, the hinge 24 achieves as high torque efficiency by using mechanical advantage to generate the required hinge torque. The mechanical advantage is defined as the perpendicular distance from the cable actuation and tensioning system 26 to the rotation axis defined by pivot pin 68. This distance is a design variable that can be adjusted based upon requirements. The tendon-actuated hinges 24 have high structural efficiency, and significantly reduce the total mass of the manipulator 20 while also achieving higher stiffness of the hinge 24. Because of the lack of gravity, the manipulator 20 uses the opposing (antagonistic) tension loops of cables 44, 46 or cables 44, 45, 46, 47 to maintain structural integrity and exert force on payloads during articulation of the hinge 24.

In each embodiment, it is to be understood that the pulleys on the spreader arm(s) 32 can be eliminated, and instead, the cables 44, 46 can interengage with the ends 52, 54 of the spreader arm(s) 32 and slide along the ends of the spreader arm(s) 32 such that the ends 52, 54 of the spreader arm(s) 32 provide the non-driven elements. The spreader arm(s) 32 can disengage from the cables 44, 46 and re-engage as necessary during articulation of the hinge 24. In this configuration, the ends 52, 54 of the spreader arm(s) 32 provide the non-driven elements of the cable actuation and tensioning system 26.

The tension stiffening provides a versatile approach that is integrated with variable length link arms 22*a*, 22*b*, 22*c* or spreaders 32, and can be selectively applied to only a subset of the link arms 22*a*, 22*b*, 22*c* (only near the root for example) or spreaders 32 as needed to meet performance and operational requirements.

The link arms 22*a*, 22*b*, 22*c* and spreader arm(s) 32 can be deployable members (STEMS for example) to allow for more efficient packaging. The very long versions (many link arms) of the manipulator 20 can be deployable structures, erectable structures, manufactured on-orbit, or some combination of those methods.

The cable actuation and tensioning system 26 reduces the costs of manufacture of the manipulator 20 and reduces cross-sectional size and weight of the link arms 22*a*, 22*b*, 22*c*.

Because of the passive antagonistic control about the hinge 24, a significant mechanical advantage is achieved. Since the motors are non-co-located (the motor drive axis is not on the same axis or substantially the same axis as the hinge axis 68 where the link arms 22a, 22b, 22c rotate) and since the motor(s) 48 are remote from hinge axis 68, a significant amount of mechanical advantage is provided by the cable actuation and tensioning system 26.

If desired, multiple mounting locations can be provided on the link arms 22a, 22b, 22c and the spreader arm(s) 32 to allow the location of the pulleys, hoists or capstans to be adjusted. Preferably, this is accomplished before the manipulator 20 is put into service, but this is not required. The length of the cabling can be adjusted in service to allow dynamic adjustment of the pulley, hoists or capstan with the springs 50a, 50b (or other devices) taking up the slack in the cables 44, 46 or cables 44, 45, 46, 47.

If desired, other arrangements of cables 44, 46 employing single or multiple cables, incorporating additional pulleys, pulley systems, capstans and motors can be used. For example, the additional pulleys can be mounted anywhere on the link arms 22a, 22b, 22c and/or spreader arm(s) 32.

While preferred embodiments of the present invention are shown and described, it is envisioned that those skilled in the art may devise various modifications of the present invention without departing from the spirit and scope of the appended claims.

What is claimed is:

1. A manipulator comprising:
    a plurality of link arms;
    a hinge connecting adjacent link arms of the plurality of link arms together to allow said adjacent link arms to rotate relative to each other; and
    a cable actuation and tensioning system provided between adjacent link arms, said cable actuation and tensioning system comprising:
        at least one spreader arm;
        a plurality of driven elements each attached to a respective one of said adjacent link arms remote from said hinge;
        a non-driven element provided on each of the others of said adjacent link arms and at a respective end of said at least one spreader arm, wherein each non-driven element is remote from said hinge;
        at least one cable routed around the driven and non-driven elements;
        a pair of tensioning members each connected to a respective one of the at least one spreader arm and one of the plurality of link arms for accommodating changes in a length of the at least one cable; and
        a motor for driving said driven element to circulate the cable around the driven and non-driven elements;
        wherein the at least one cable and the pair of tensioning members are arranged in an antagonistic manner to provide bi-directional motion of the adjacent link arms with respect to the hinge.

2. The manipulator of claim 1, wherein said at least one driven element is a capstan.

3. The manipulator of claim 1, wherein the plurality of driven elements includes a hoist.

4. The manipulator of claim 1, wherein each said non-driven element is a pulley.

5. The manipulator of claim 1, wherein one of said non-driven elements is an end of said spreader arm.

6. The manipulator of claim 1, wherein each said non-driven element is a pulley mounted on each end of said spreader arm, said cable being detachable from at least one of said pulleys.

7. The manipulator of claim 1, wherein the at least one spreader arm includes a plurality of spreader arms and said non-driven element is a ring connected to each of said spreader arms and to one of said link arms.

8. The manipulator of claim 1, wherein the tensioning members are springs.

9. The manipulator of claim 1, wherein a portion of said at least one cable is formed by at least one non-bending tension member.

10. The manipulator of claim 1, wherein at least one of said non-driven elements can disengage from said cable during actuation of the cable actuation and tensioning system.

11. The manipulator of claim 1, wherein the plurality of link arms includes at least three links arms and the hinge includes a plurality of hinges, and wherein some of said hinges rotate about a first axis and others of said hinges rotate about other axes which are angled relative to said first axis.

12. The manipulator of claim 1, wherein between first and second ones of said link arms, said hinge comprises
    a central member for holding said spreader arm;
    a first torque reaction tube rotatably attached to said first link arm, said first torque reaction tube rotatably attached to said central member; and
    a second torque reaction tube rotatably attached to said second link atm, said second torque reaction tube rotatably attached to said central member.

13. The manipulator of claim 12, wherein said hinge further comprises a frame connected to each of said link arms, each said frame having at least one retaining guide thereon, each said torque reaction tube having at least one tab thereon which is capable of engaging with said at least one retaining guide.

14. The manipulator of claim 12, wherein each of said central member, said first torque reaction tube and said second torque reaction tube have a central passageway therethrough which allow for the passage of wires therethrough.

15. A cable actuation and tensioning system for a manipulator having adjacent first and second link arms joined by a hinge that allows the adjacent first and second link arms to move relative to each other, the system comprising:
    a spreader arm coupled to the adjacent first and second link arms via the hinge;
    a first pulley disposed at an end of the spreader arm remote from the hinge;
    a second pulley positioned on the first link arm remote from the hinge;
    a capstan and a motor attached to the second link arm remote from the hinge;
    at least one tensioning element, each of which is positioned on one or more of the first link arm and the spreader arm; and
    a cable routed around the first pulley, the second pulley, and the capstan, wherein the capstan is driven via the motor to circulate the cable via the first pulley, the second pulley, and the at least one tensioning element and thereby provide bi-directional motion of the adjacent link arms respect to the hinge, and wherein the capstan and the at least one tensioning element are arranged in an antagonistic manner with respect to the hinge such that tension is maintained on the cable during the bi-directional motion.

* * * * *